June 5, 1928.  
L. A. BEARDSLEY  
GAME TRAP  
Filed April 3, 1926  
1,672,051  
2 Sheets-Sheet 2
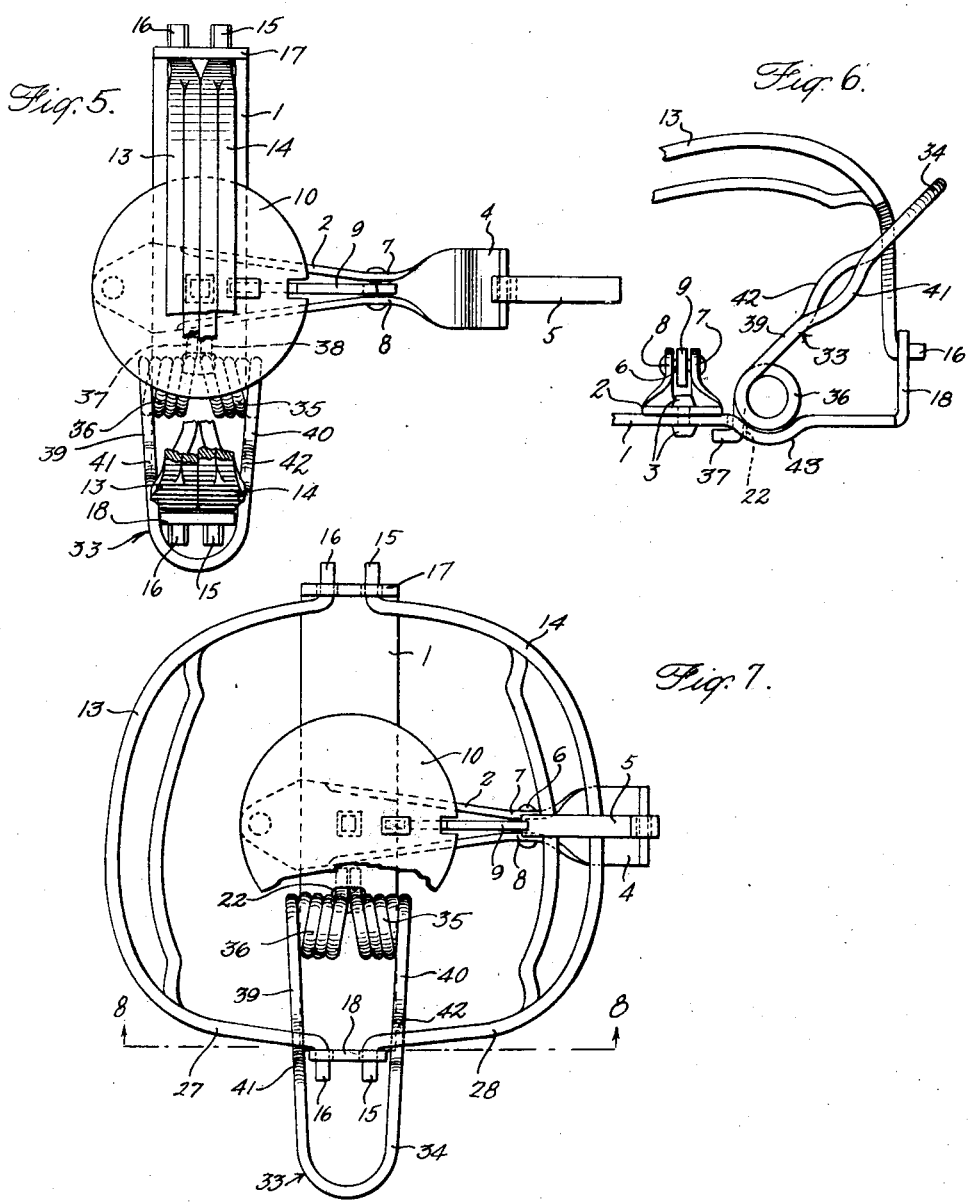
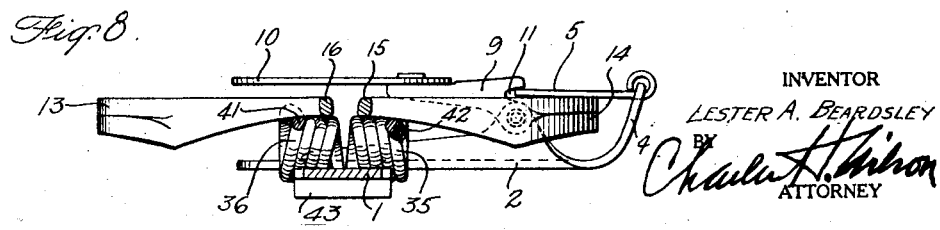
INVENTOR  
LESTER A. BEARDSLEY  
BY  
ATTORNEY Patented June 5, 1928.

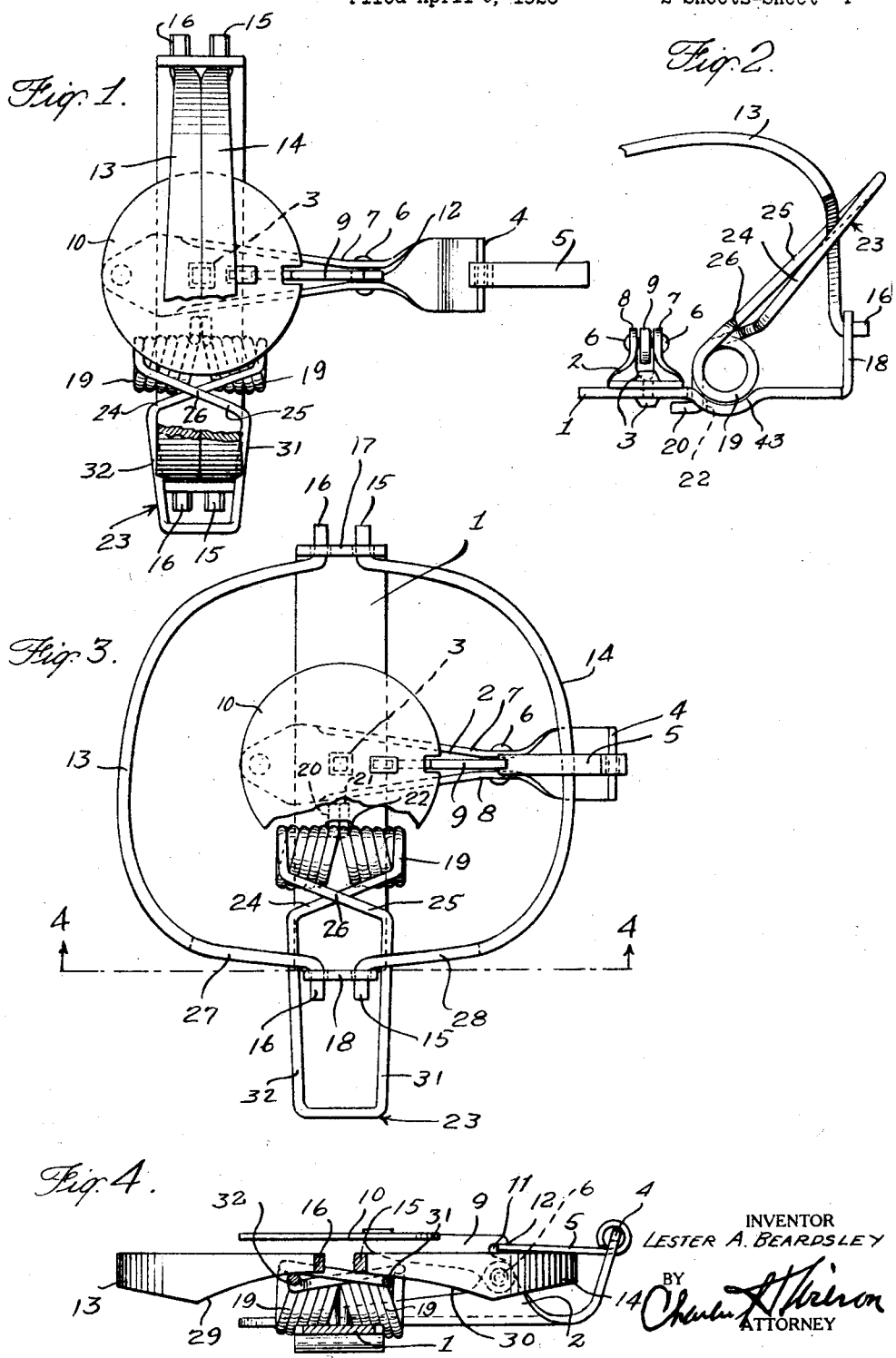

1,672,051

UNITED STATES PATENT OFFICE.

LESTER A. BEARDSLEY, OF NORWICH, NEW YORK, ASSIGNOR TO NORWICH WIRE WORKS, INC., OF NORWICH, NEW YORK, A CORPORATION OF NEW YORK.

GAME TRAP.

Application filed April 3, 1926. Serial No. 99,505.

This invention relates to game traps, more particularly to that type of trap wherein a pair of opposed gripping jaws are pivotally mounted upon a foundation or base, and are actuated by spring means operating upon both of said jaws.

One of the objects of the invention is to provide a new and improved trap of exceedingly simple construction wherein the number of operative parts is reduced to a minimum, thereby reducing the cost of production.

Another object of the invention is to provide a trap of the coil spring type, wherein a lever formed by an extension of the spring, provides an actuating member for the jaws of the trap, the construction of the said lever being such that both jaws of the trap will lie in the same horizontal plane when the trap is in set condition and in a plane substantially parallel with the pan of the trap.

A further object of the invention is to provide a trap of the above character, in which the cost of assembly is reduced to a minimum.

Other objects and aims of the invention, more or less specific than those referred to above, will be in part obvious and in part pointed out in the course of the following description of the elements, combinations, arrangements of parts and application of principles, constituting the invention; and the scope of protection contemplated will be indicated in the appended claim.

In the accompanying drawings wherein I have illustrated preferred forms of embodiments of my invention, Figure 1 is a top plan view showing one embodiment of my improved trap in unset condition.

Figure 2 is a side elevational view of a portion of the trap.

Figure 3 is a top plan view of the trap, showing the same in set condition.

Figure 4 is a vertical sectional view taken in line 4—4 of Fig. 3 through the trap looking in the direction of the arrow.

Figure 5 is a top plan view showing another embodiment of my improved trap in unset condition.

Figure 6 is an elevational view of a portion of the trap.

Figure 7 is a top plan view of the trap showing the same in set condition, and

Figure 8 is a view taken on the line 8—8 of Figure 7 looking in the direction of the arrows.

Referring now to the drawings, particularly to the embodiment of my invention disclosed in Figures 1 to 4 inclusive, the reference numeral 1 denotes the base or foundation of the trap, 2 the cross piece which is anchored to the foundation intermediate its ends, as by means of the rivet 3. The cross piece 2 which is preferably flanged upwardly to give it strength and stiffness, extends laterally of the trap and is provided at its outer end with an upwardly extending flange 4, upon which is pivotally mounted a detent 5. Pivotally mounted upon the pin 6 which extends through the flanges 7 and 8 of the cross piece, is an arm 9, upon which is mounted the pan 10 of the trap. The arm 9 is recessed at 11 to form the shoulder 12, under which the detent 5 is received when the trap is set.

The reference numerals 13 and 14 denote the jaws of the trap, which jaws having formed upon their end portions the pintles 15 and 16 respectively, are received in apertures formed in upwardly extending flanges 17 and 18 provided respectively upon the outer ends of the foundation 1.

As thus far described, this trap does not differ materially from other well known forms of game traps.

Referring now to the actuating means for the jaws of the trap, the reference numeral 19 denotes a coil spring formed of a single length of spring wire; the inner ends 20 and 21 of which lie adjacent each other and extend through an aperture 22 formed in the base or foundation 1.

These ends 20 and 21 of the spring after extending through the aperture 22 of the foundation, are bent to extend forwardly as clearly shown in Figure 2 of the drawing.

The intermediate portions of the length of wire out of which the spring 19 is formed, are fashioned into a lever 23; the legs 24 and 25 of said lever crossing each other at the point 26 adjacent the coil spring 19, the lever which is in the form of a loop extending upwardly and rearwardly to receive the legs 27 and 28 of the jaws 13 and 14 respectively. The legs 27 and 28 of the jaws 13 and 14 are provided with gradually sloping shoulders 29 and 30 which are adapted to be engaged by side members 31 and 32 of the lever 23, so that when the trap is sprung, the said side members traversing the inclined shoulders 29 and 30 of the jaws, will move later into closed position as indicated in Figures 1 and 2. The engagement of the jaws with each other or with the leg or other part of the anatomy of the animal takes place before the side members of the lever 23 reach the outer ends of the shoulders 29 and 30. The spring 19, it will be noted, is under constant tension between its anchorage in the intermediate portion of the foundation 1 and the point of engagement of the lever 23 with the trap jaws.

In setting the trap, the lever 23 is swung downwardly by the trap against the tension of the coil spring 19, whereby the jaws 13 and 14 will swing downwardly. The detent 5 is then swung over the jaw 14 and the end of said detent caught under the shoulder 12 of the pan arm 9. The trap will then be in set condition and pressure on the pan 10 will cause it to swing downwardly, thereby releasing the detent 5, whereupon the lever 23, impelled by the spring 19, will swing the jaws upwardly to closed position.

In the art of trapping, it is quite essential that the jaws lie in the same horizontal plane when the trap is in set position, and in a plane substantially parallel with that of the pan. It will be noted that when the trap is set and the jaw 14 held in locked position against the tension of the spring 19, there is a tendency to give the lever 23 a lateral twist or torque, the effect of which would ordinarily be to carry the side piece 32 of said lever upwardly and thus elevate the free jaw 13 of the trap into a plane higher than the plane of the fixed jaw, and inclined with respect thereto. In bending the intermediate portion of the spring wire therefore, the bending is so accomplished that the side piece 32 of the lever 23 will lie slightly below the plane of the side piece 31 of said lever, so that the slight twist imparted to the lever 23 due to the holding of the spring under tension by the detent 5, will carry the side piece 32 of said lever into a plane parallel with that of the side piece 31 of said lever. Thus, both the locked and free jaws will have their working faces in substantially the same horizontal plane when the trap is set.

Referring now to the embodiment of my invention illustrated in Figures 5 to 8 inclusive, the construction of the foundation, the jaws, the mounting for the later, the cross piece and associated pan and detent, are substantially identical with the construction of the first described embodiment of my invention. The actuating spring is however of a somewhat different character, the construction of which will now be described. This spring designated by the numeral 33 is comprised of a piece of spring wire formed into the loop 34, each leg of the spring near its outer end being formed into a coil, said coils being indicated at 35 and 36, the free ends 37 and 38 being extended through the aperture 22 formed in the base plate or foundation as in the first described embodiment of the invention. It will be noted that the coils 35 and 36 extend inwardly from the legs 39 and 40 of the spring. Leg 39 of the spring 33 has formed therein the depression 41, and the leg 40 of said spring has formed therein, the raised portion or protuberance 42; said parts of the spring being so relatively located that when the trap is set, the leg 28 of the locked jaw 14 will rest in the depression 41 and the leg 27 of the jaw 13 will engage with the protuberance.

The construction just described accomplishes the same result as is accomplished by the disposition of the legs 31 and 32 of the actuating spring in the first described embodiment of the invention, that is to say, the depression 41 and the protuberance 42 compensate for the lateral twist or torque given the spring by reason of the leg 39 thereof being restrained by the locked jaw 14; the arrangements of the parts being such that the jaws will lie in substantially a parallel plane and in a plane substantially parallel with that of the pan 10 when the trap is in set condition.

In the present embodiments of my invention, the foundation 1 is preferably formed with a circular depression 43 intermediate its ends directly underneath the coils of the spring 19, the latter lying in said depression in the first described embodiment of the invention, and underneath the coils 35 and 36 of the spring in the last described embodiment thereof.

In as much as a portion of the pan 10 of the trap overlies the coils of the actuating spring, the locating of said coil in the depression 43 permits the pan to be given a lower position with respect to the trap than it would assume if the coils were positioned upon a straight or flat surface of the foundation.

In assembling the trap, assuming the parts have been previously formed, it is merely necessary to insert the ends 20 and 21 of the coil spring through the aperture formed in the base plate of the trap, insert the legs of the jaws through the loop formed in the actuating lever and then spring the pintles of the trap jaws into the apertures formed in the upwardly extending flanges of the foundation 1, whereupon the trap is in operative position. It will accordingly be seen that there are really but two operations necessary in assembling this trap. Moreover, the trap is composed of a minimum number of parts.

As many changes could be made in this construction without departing from the scope of the following claim, it is intended that all matter contained in the above description or shown in the accompanying drawing shall be interpreted as illustrative only and not in a limiting sense.

Having thus described my invention, what I claim as new and desire to secure by Letters Patent, is:—

The combination in a game trap, of a base plate having jaws pivotally mounted thereon, a coil spring formed of a single length of spring wire, the ends of which adjacent the coil part of the spring are brought together and extended forwardly and then downwardly through an aperture formed in the intermediate portion of the base plate and forming an anchorage for the spring, the legs of the intermediate portion of said length of wire crossing each other adjacent the coil of the spring, and the remainder of said intermediate portion of the wire forming a loop adapted to receive the legs of the trap jaws, one of the legs of said loop engaging the locked jaw of the trap when the same is set, the other leg of said loop engaging the free jaw, and the leg of said loop engaging the free jaw normally lying in a plane below that engaging the locked jaw when the trap is in unset condition.

In testimony whereof, I affix my signature.

LESTER A. BEARDSLEY.